(12) United States Patent
Hauenstein et al.

(10) Patent No.: US 8,154,417 B2
(45) Date of Patent: Apr. 10, 2012

(54) COMPACT SELF-CONTAINED CONDITION MONITORING DEVICE

(75) Inventors: Kenneth Lee Hauenstein, Seneca Falls, NY (US); Douglas Paddock, Penn Yan, NY (US); Mark Alexander Playford, Seneca Falls, NY (US); Jermiah Dennis Quill, Cayuga, NY (US); David A. Rice, Syracuse, NY (US); Patrick J. Brusa, Syracuse, NY (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 408 days.

(21) Appl. No.: 12/240,287

(22) Filed: Sep. 29, 2008

(65) Prior Publication Data
US 2009/0231153 A1 Sep. 17, 2009

Related U.S. Application Data

(60) Provisional application No. 60/997,911, filed on Oct. 5, 2007.

(51) Int. Cl.
*G08B 21/00* (2006.01)
(52) U.S. Cl. ............ 340/683; 73/602; 73/660; 318/490; 340/511; 340/635; 340/679; 340/680; 417/63
(58) Field of Classification Search .................. 340/635, 340/679, 680, 683, 511; 417/63; 318/490; 73/660, 649, 658, 570, 593, 604, 602, 659
See application file for complete search history.

(56) References Cited

U.S. PATENT DOCUMENTS

| 4,164,149 | A | * | 8/1979 | Okubo ............................ 73/594 |
| 4,245,370 | A | | 1/1981 | Baker |
| 4,367,506 | A | | 1/1983 | Lapsker |
| 4,399,513 | A | * | 8/1983 | Sullivan et al. ................ 702/182 |
| 4,467,260 | A | | 8/1984 | Mallick, Jr. et al. |

(Continued)

FOREIGN PATENT DOCUMENTS
CN 1081323 C 3/2002

OTHER PUBLICATIONS

International Search Report issued in counterpart international application PCT/US08/78266 filed Sep. 30, 2008, ISR: date Dec. 8, 2008, 4 pages.

(Continued)

*Primary Examiner* — Brent Swarthout

(57) ABSTRACT

The present invention provides a new and unique method and apparatus for monitoring a device, such as a pump. The device may also include a fan, compressor, turbine or other rotating or reciprocating piece of machinery. In one embodiment, the method features sensing in a first device both a start-up vibration at a start-up time after the first device is affixed to a second device to be monitored and a subsequent vibration level at a subsequent time after the start-up time, and providing both a start-up vibration level signal containing information about the start-up vibration level of the second device, and a subsequent vibration level signal containing information about the subsequent vibration level of the second device; and monitoring in the first device the condition of operation of the second device based on a comparison of the start-up vibration level signal in relation to the subsequent vibration level signal. The apparatus may take the form of one or more modules and/or chipset for performing the steps and functionality of the aforementioned method.

20 Claims, 8 Drawing Sheets

U.S. PATENT DOCUMENTS

| | | | |
|---|---|---|---|
| 4,506,218 A | | 3/1985 | Brown et al. |
| 5,189,350 A | | 2/1993 | Mallett |
| 5,237,310 A | | 8/1993 | Smith |
| 5,591,916 A | * | 1/1997 | Byrne ............................ 73/649 |
| 5,847,658 A | | 12/1998 | Irie et al. |
| 5,852,351 A | | 12/1998 | Canada et al. |
| 6,257,066 B1 | | 7/2001 | Chandler et al. |
| 6,412,131 B1 | | 7/2002 | Zhao et al. |
| 6,672,168 B2 | | 1/2004 | Higgins |
| 2002/0140566 A1 | | 10/2002 | Holroyd |
| 2003/0043046 A1 | | 3/2003 | Watwood et al. |
| 2003/0112146 A1 | | 6/2003 | Sobel et al. |
| 2003/0159515 A1 | * | 8/2003 | Tonomura ...................... 73/584 |
| 2005/0231350 A1 | | 10/2005 | Littrell et al. |
| 2005/0284226 A1 | | 12/2005 | Boda et al. |
| 2006/0265106 A1 | * | 11/2006 | Giles et al. .................... 700/283 |
| 2009/0093975 A1 | * | 4/2009 | Judd .............................. 702/34 |

OTHER PUBLICATIONS

Page 1 of Office Action issued in China on Jul. 12, 2011 in counterpart CN application No. 200880115571.2 (1 page).

English language abstract of CN1081323 (1 page).

* cited by examiner

COMPACT SELF-CONTAINED CONDITION MONITORING DEVICE

CROSS-REFERENCE TO RELATED APPLICATIONS

This application claims benefit to provisional patent application No. 60/997,911, filed 5 Oct. 2007, which is hereby incorporated in its entirety be reference.

BACKGROUND OF THE INVENTION

1. Field of the Invention

The present invention relates to a method and apparatus for a first device to monitor the operation of a second device, including the monitoring of a pump, a fan, compressor, turbine or other rotating or reciprocating piece of machinery; and more particularly related to a disposable, compact, self-contained, battery operated, warning and alarming condition monitoring device for monitoring a pump.

2. Brief Description of Related Art

Temperature and vibration monitoring of rotation equipment is a known and accepted method to determining the health of rotating equipment.

Temperature measurement of equipment as a diagnostic tool is simple and relatively inexpensive to implement. Temperature information is useful only as a go/no go indication of equipment condition.

Vibration monitoring is an accepted proven diagnostic tool for accessing rotating equipment health. Periodic monitoring of machine vibration is a principle component of preventative maintenance programs in industry. The conditions that vibration monitoring can detect are bearing condition, shaft straightness, out of balance condition, out of alignment condition, wear, product buildup, process change, corrosion, and looseness. Vibration monitoring equipment can be expensive, in the tens of thousands of dollars. As such, only very expensive rotating equipment have monitors attached for continuous monitoring. A typical chemical plant has 1000 pumps installed and in operation. There may be less than 10 pumps or pieces of rotation equipment in a typical chemical plant that fit the criterion that would justify the expense of dedicated vibration monitors. For 99% of the rotating equipment that cannot justify the expense of continuous vibration monitoring, either, no vibration measurement is employed or a walk around vibration program is used employing expensive portable vibration equipment and manual labor expense. The periodic monitoring requires trained personnel to collect the vibration in a consistent manner and the timely analysis of the collected data to determine equipment health. Most plants that collect vibration data do not have the staffing to analyze the vibration data in a timely manner and don't catch problems before catastrophic failure occurs. The data gets analyzed as a post mortem event which is too late to prevent failures. The vibration analysis should be used as a predictive tool to give an early warning of impending failure so that maintenance can be performed to minimize equipment and production loss.

For example, periodic manual monitoring of equipment with portable hand held vibration and/or temperature instruments is known in the art. In particular, manual monitoring of equipment, such as pumps, is typically done, e.g. every 4-6 weeks, based on a plant's maintenance schedule. However, this time period may vary. The shortcoming of manual monitoring is that it only provides a measure of the pump condition for the snap shot in time for which it is taken. The technician must be adequately trained to operate relatively expensive equipment and all units must be checked in order to determine if a problem exists. Pump health can change between walkarounds due to system upsets and/or operator error. This type of manual system does not provide continuous monitoring and as such does not optimize preventive maintenance.

In view of this, there is a need in the industry for a technique or low cost, easy-to-use device for near continuously monitoring a pump and providing an indication of the condition of operation of the pump based on an evaluation of one or more sensed physical parameters.

SUMMARY OF THE INVENTION

The present invention provides a new and unique method and apparatus for a first device to monitor the operation of a second device, such as a pump, a fan, compressor, turbine or other rotating or reciprocating piece of machinery.

According to some embodiments of the present invention, the method features sensing in the first device both a start-up vibration at a start-up time after the first device is affixed to the second device to be monitored and a subsequent vibration level at a subsequent time after the start-up time, and providing both a start-up vibration level signal containing information about the start-up vibration level of the second device, and a subsequent vibration level signal containing information about the subsequent vibration level of the second device; and monitoring in the first device the condition of operation of the second device based on a comparison of the start-up vibration level signal in relation to the subsequent vibration level signal.

According to some embodiments of the present invention, the apparatus may take the form of one or more modules and/or a chipset for performing the steps and functionality of the aforementioned method.

According to some embodiments of the present invention, the apparatus may also take the form of a disposable, compact, self-contained, battery operated, warning and alarming condition monitoring device for monitoring a device, such as a pump, featuring one or more modules configured for performing the functionality set forth herein.

According to some embodiments of the present invention, the disposable, compact, self-contained, battery operated, warning and alarming condition monitoring device may be affixed or mounted on the second device, e.g. affixed on a bearing frame of the pump.

According to some embodiments of the present invention, the monitoring of the second device by the first device may include one or more of the following features: providing an indication containing information about the condition of operation of the second device, including an audio indication, or a visual indication, or some combination thereof; activating a start-up procedure in order to determine the start-up vibration level; activating a monitoring procedure in order to determine the subsequent vibration level and monitor the second device; periodically entering the first device into a low power mode in order to save power; or some combination thereof.

According to some embodiments of the present invention, the start-up vibration level may be determined based on a multiple of a sensed start-up vibration level measured along one or more axes of the second device, and may also be determined so as to be within a range having a lowest possible predetermined start-up vibration level and a highest possible predetermined start-up vibration level.

According to some embodiments of the present invention, the start-up vibration level may be based on the operation of the second device at the start-up time so as to be unique to the second device.

According to some embodiments of the present invention, the present invention may take the form of a computer-readable storage medium having computer-executable components, when executed on a computer processor, for performing a method comprising: sensing in a first device both a start-up vibration at a start-up time after the first device is affixed to a second device to be monitored and a subsequent vibration level at a subsequent time after the start-up time, and providing both a start-up vibration level signal containing information about the start-up vibration level of the second device, and a subsequent vibration level signal containing information about the subsequent vibration level of the second device; and monitoring in the first device the condition of operation of the second device based on a comparison of the start-up vibration level signal in relation to the subsequent vibration level signal.

By way of example, the evaluation of the one or more sensed vibration levels may be made by one or more modules contained within the monitoring device itself, although embodiments are also envisioned in which one or more sensed vibration levels are provided to another device for evaluation, and in which one or more signals are received back from the other device containing information for providing the indication of the condition of operation of the device. The provisioning of the such signals between such devices may be done via a hardwired or wireless signalling configuration.

In effect, the present invention provides a novel and unique method and apparatus for monitoring vibration in a very low cost, compact configuration. This makes it economical to provide continuous monitoring on every pump or piece of rotating equipment in a chemical plant. The condition monitor may employ low cost Microelectromechanical system (MEMS) developed for the automotive industry, very low electrical power microprocessors, and the latest battery technology combined into a novel and economical device that provides early warning of equipment problems. The present invention brings down the cost of continuous monitoring equipment from tens of thousands of dollars to a few hundred dollars. The low cost makes it possible to mount this invention on every rotating machine in a plant and have the benefits of continuous monitoring without the prohibitive high cost. The low electrical power requirements allows for battery operation with long life. This allows for a small self contained sealed unit with no external wiring and a simple mechanical screw attachment to the equipment to be monitored.

The vast majority of rotating equipment and in particular centrifugal pumps rotate between 600 and 3600 revolutions per minute (rpm). The measure of vibration most useful in diagnosing equipment in this typical speed range is the measurement of velocity. The invention uses a circuit to convert the electrical output from the Microelectromechanical system (MEMS) to a voltage that is proportional to the vibration velocity of the pump. The vibration of the equipment measured as velocity is used universally to assess the machine condition. In addition to the low cost, the invention provides simple setup and operation with no special analysis skills required to determine equipment condition. The device does not require a trained equipment expert to interpret the equipment condition. Any person walking by the pump can immediately determine the pump condition by visual observation of the light emitting diodes on the monitor (green flashing OK, red flash alarm). This visual observation is not limited to light emitting diodes. Other embodiments for the visual observation can be a LCD display or other visual means. Setting the alarm level is as simple as turning the monitor on. The first function performed when the monitor is activated is to capture the current vibration level and use that baseline level to set the alarm vibration level. The alarm level is stored in the microprocessor's memory. Subsequent vibration level measurements are compared to the alarm level and the machine status is annunciated. The vibration alarm level is unique to the machine and operating conditions of the installation. The alarm level is not determined, but is uniquely determined at startup based on the particular installation.

Embodiments are also envisioned where the microprocessor processes the electrical waveform representing the machine vibration and also monitors the electrical output from the temperature sensor and triggers an alarm annunciation in the form of flashing red light emitting diodes when the alarm levels for either vibration or temperature is exceeded or flashes the green light emitting diode if the machine is below the alarm level.

DETAILED DESCRIPTION OF THE INVENTION

FIG. 1

The Basic Invention

Figure 1:
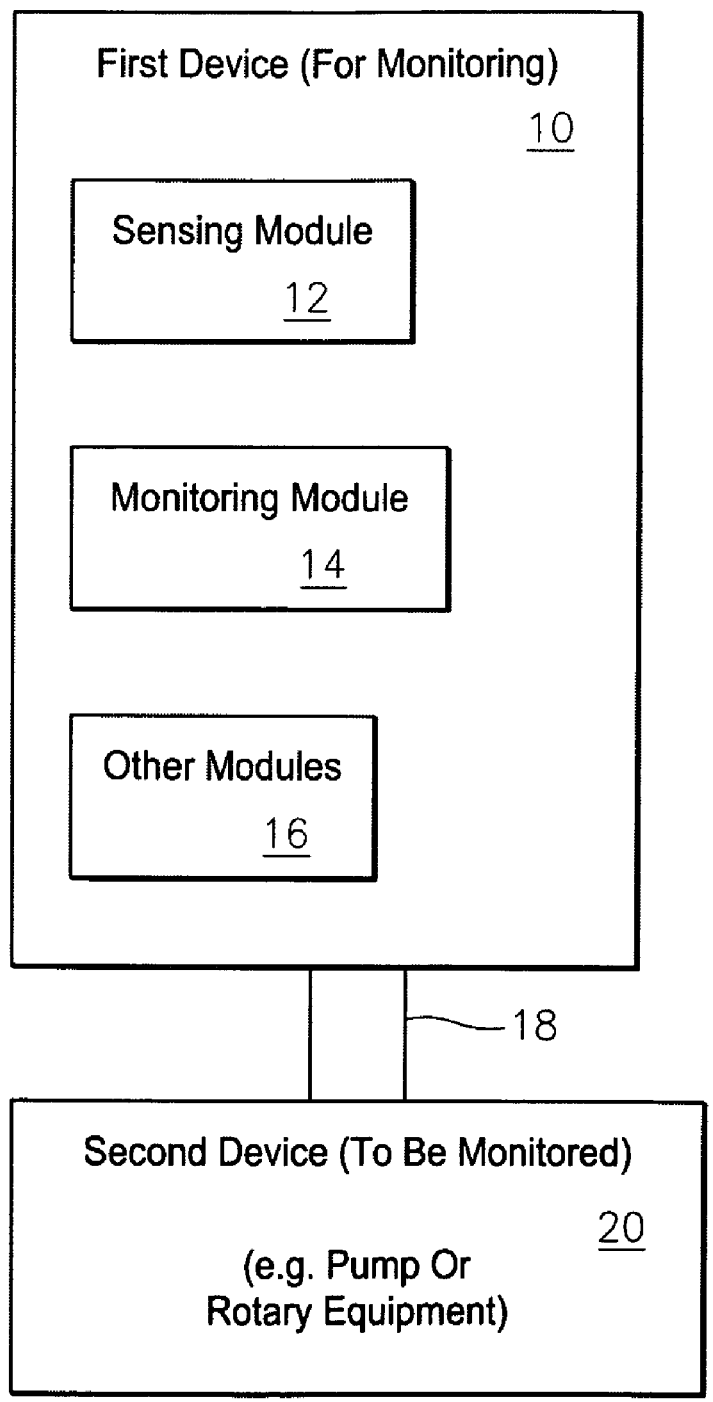
FIG. 1 is a block diagram of a first device for monitoring a second device according to some embodiments of the present invention.

FIG. 1 shows the basic invention in the form of a first device 10 that monitors the operation of a second device 20, such as a pump, a fan, compressor, turbine or other rotating or reciprocating piece of machinery. As shown, the first device 10 may be affixed or mounted on the second device 20, e.g. the first device 10 may be affixed via some affixing member 18 on a bearing frame (not shown) of the second device 20, such as a pump. The first device 10 is designed to be a disposable, compact, self-contained, inexpensive, battery operated, warning and alarming condition monitoring device. The affixing member 18 may take the form of glue, epoxy, fasteners, etc., and the scope of the invention is not intended to be limited to any particular type or kind of affixing member either now known or later developed in the future, or the overall manner in which the first and second devices are coupled together.

The first device 10 includes a sensing module 12, a monitoring module 14 and other modules 16.

The sensing module 12 may include one or more modules configured for sensing in the first device both a start-up vibration at a start-up time after the first device is affixed to the second device to be monitored and a subsequent vibration level at a subsequent time after the start-up time, and providing both a start-up vibration level signal containing information about the start-up vibration level of the second device, and a subsequent vibration level signal containing information about the subsequent vibration level of the second device. Techniques for sensing vibrations levels are known in the art and the scope of the invention is not intended to be limited to any particular type or kind thereof either now known or later developed in the future. The technique according to the present invention ensures that the start-up vibration level is based on the operation of the second device at the start-up time so as to be unique to the second device, as opposed to some factory set, and/or predetermined level unrelated to the current operating conditions of the second device.

The monitoring module 14 may include one or more modules configured for monitoring in the first device the condition of operation of the second device based on a comparison of the start-up vibration level signal in relation to the subsequent vibration level signal. The monitoring of the second device by the first device may include one or more of the following: providing an indication containing information about the condition of operation of the second device, including an audio indication, or a visual indication, or some combination thereof; activating a start-up procedure in order to determine the start-up vibration level; activating a monitoring procedure in order to determine the subsequent vibration level and monitor the second device; periodically entering the first device into a low power mode in order to save power; or some combination thereof.

According to some embodiments of the present invention, the start-up vibration level may be determined based on a multiple of a sensed start-up vibration level measured along one or more axes of the second device. For example, if a start-up vibration level of 0.135 inches/second is sensed, then the start-up vibration level may be determined to be 0.270 inches/second, effectively making the multiple 2× (i.e. doubled the sensed vibration). In operation, when the subsequent vibration level is sensed, compared to and exceeds 0.270 inches/second, then the monitoring module 14 may issue an indication of an alarm or warning condition. The scope of the invention is not intended to be limited to any particular multiple, and may include other multiples such as 1.5×, 1.75×, 2.5×, etc.

Moreover, according to some embodiments of the present invention, the start-up vibration level may also be determined so as to be within a range having a lowest possible predetermined start-up vibration level and a highest possible predetermined start-up vibration level. For example, if a start-up vibration level of 0.001 inches/second is sensed (which is very low), then the start-up vibration level may be determined to be 0.125 inches/second, effectively setting the value to a lowest possible predetermined start-up vibration level. Alternatively, if a start-up vibration level of 0.300 inches/second is sensed (which is very high), then the start-up vibration level may be determined to be 0.500 inches/second, effectively setting the value to a highest possible predetermined start-up vibration level.

The other modules 16 may include one or more modules that are known in the art, that are configured for performing other functionality that do not form part of the underlying invention, and thus that are not described in detail herein, including but not limited to, a power module for powering the first device, a other sensing modules configured for sensing one or more other parameters, e.g. temperature, and monitoring the second device 20 based on the same, as well as other modules either now known or later developed in the future.

The modules 12 and 14 may be implemented using hardware, software, firmware, or a combination thereof, although the scope of the invention is not intended to be limited to any particular embodiment thereof. In a typical software implementation, such a module would be one or more microprocessor-based architectures having a microprocessor, a random access memory (RAM), a read only memory (ROM), input/output devices and control, data and address buses connecting the same. A person skilled in the art would be able to program such a microprocessor-based implementation to perform the functionality described herein without undue experimentation. The scope of the invention is not intended to be limited to any particular implementation using technology known or later developed in the future. Consistent with that described above, embodiments are envisioned in which the functionality of the modules 12 and 14 are implemented within one or more of the other modules 16.

Moreover, the scope of the invention is intended to include either module 12 or 14 being a stand alone module, or instead forming part of one or more of such other modules 16. In other words, the scope of the invention is not intended to be limited to where the functionality of the modules 12 or 14 is implemented.

According to some embodiments of the present invention, the modules 12 or 14 may take the form of a chipset for performing the functionality thereof.

FIG. 2

Functional Block Diagram

Figure 2:
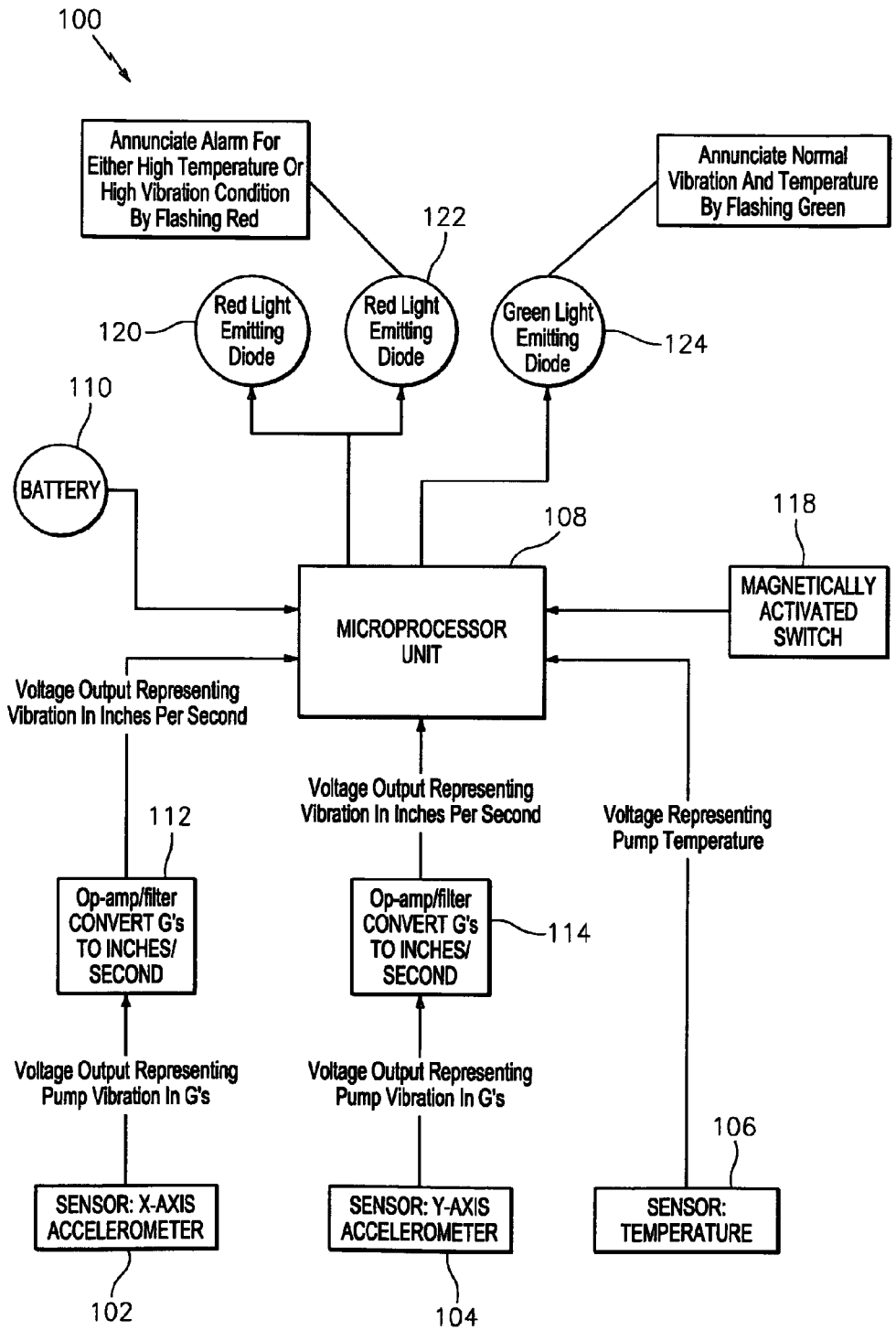
FIG. 2 is a functional block diagram of a disposable, compact, self-contained, battery operated, warning and alarming condition monitoring device according to some embodiments of the present invention.

FIG. 2 shows, by way of example, a function block diagram of one embodiment of the first device 10 (FIG. 1) in the form of a Compact, Self-Contained Monitoring device also generally indicated as 100, which may be secured to the pump bearing frame, measure the vibration and temperature, and indicate the status using light Emitting Diodes. The following is a description of the functional block diagram shown in FIG. 2 working from the bottom up.

Accelerometers 102, 104 located in the monitoring device 100, measure the acceleration in g's. One accelerometer measures vibration in the vertical pump direction and the other sensor measures vibration in the horizontal pump direction. The device is not limited to two axis vibration as an embodiment for three axis vibration is also envisioned. A voltage proportional to the acceleration in g's is output to an associated operational amplifier 112, 114 which is configured as a filter. The associated operational amplifier 112, 114 convert the G's to inches/second and provide the same to a microprocessor unit 108 as a voltage output representing vibration in inches/second. In effect, the output of the op-amp/filter 112, 114 is an analog voltage that is proportional to the acceleration in inches per second. The output of each op-amp/filter 112, 114 is sampled by the microprocessor unit's analog to digital hardware. As shown, there is a separate op-amp/filter 112, 114 for each accelerometer 102, 104, although the scope of the invention is not intended to be limited to the same. Moreover, accelerometers and operational amplifiers are known in the art and the scope of the invention is not intended to be limited to any particular type or kind thereof either now known or later developed in the future.

The device 100 also has a sensor 106 for temperature that takes the form of an output of the temperature as an analog voltage proportional to the pump bearing frame temperature.

The output of the temperature sensor 106 is also sampled by the microprocessor unit's analog to digital hardware.

The battery 110 powers the microprocessor unit 108, op-amps 112, 114, temperature sensor 106, light emitting diodes (LEDs) 120, 122, 124 and the magnetically activated switch 118. The device or unit 100 is totally self-contained within a housing for affixing to the second device 20 (FIG. 1).

The magnetically activated switch 118 may be e.g., a Hall effect solid state switch which is used as the human-to-machine input device to wake the microprocessor unit 108 from it's low power mode (sleep) and to set modes and to put the microprocessor back to sleep. The invention is not limited to a Hall switch but may include other methods for turning the device "on" such as a photocell, infrared device, LED or a simple switch.

The microprocessor unit 108 monitors the magnetically activated switch 118, samples the signals from the filters 112, 114 and sensor 106, executes the logic algorithms and activates the LEDs to indicate pump status.

The LEDs 120, 122, 124 are the human-to-machine output device used to annunciate pump status and mode settings.

Figure 3A:
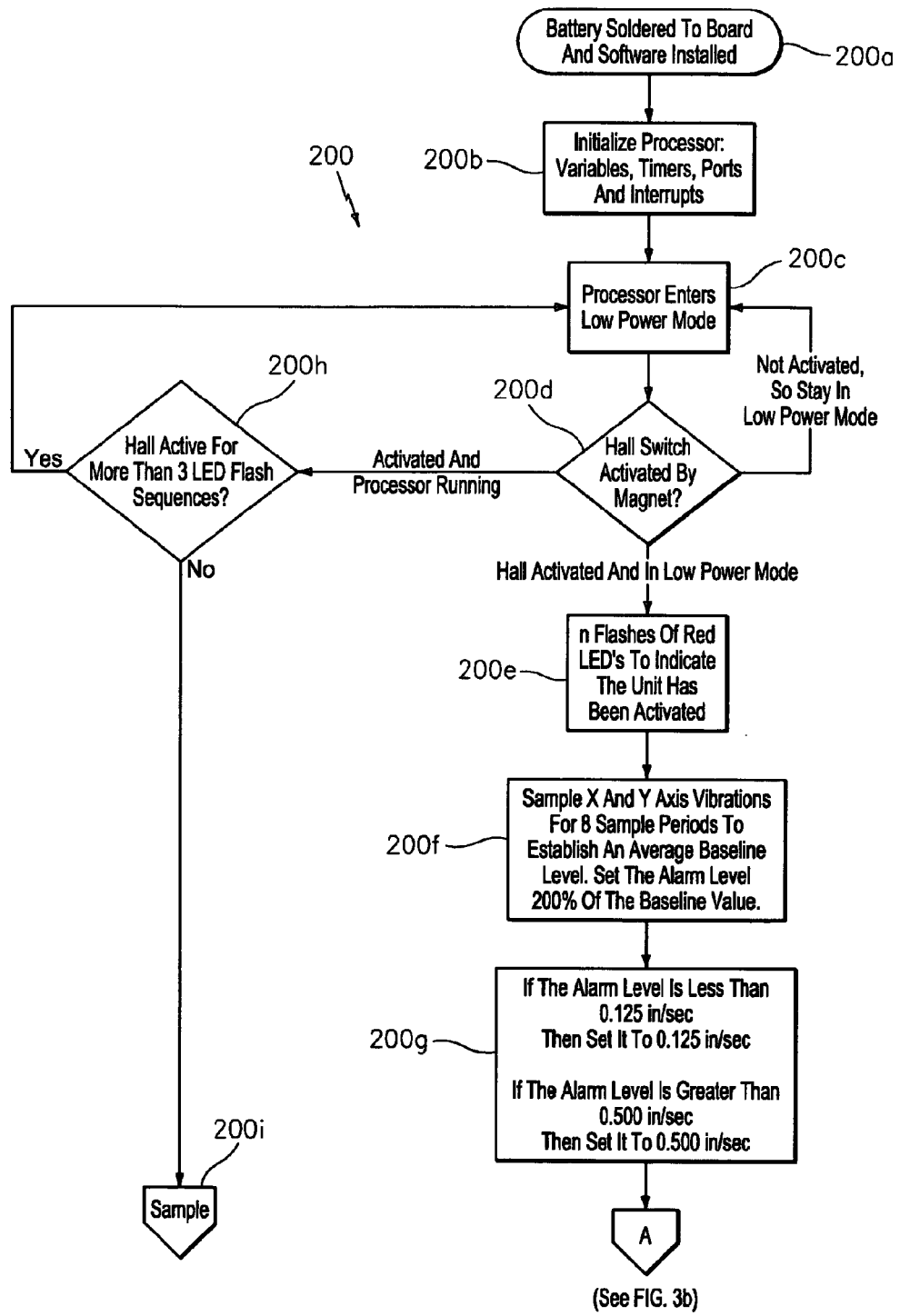
FIGS. 3a and 3b are a logic flowchart having steps of a method according to some embodiments of the present invention.
Figure 3B:
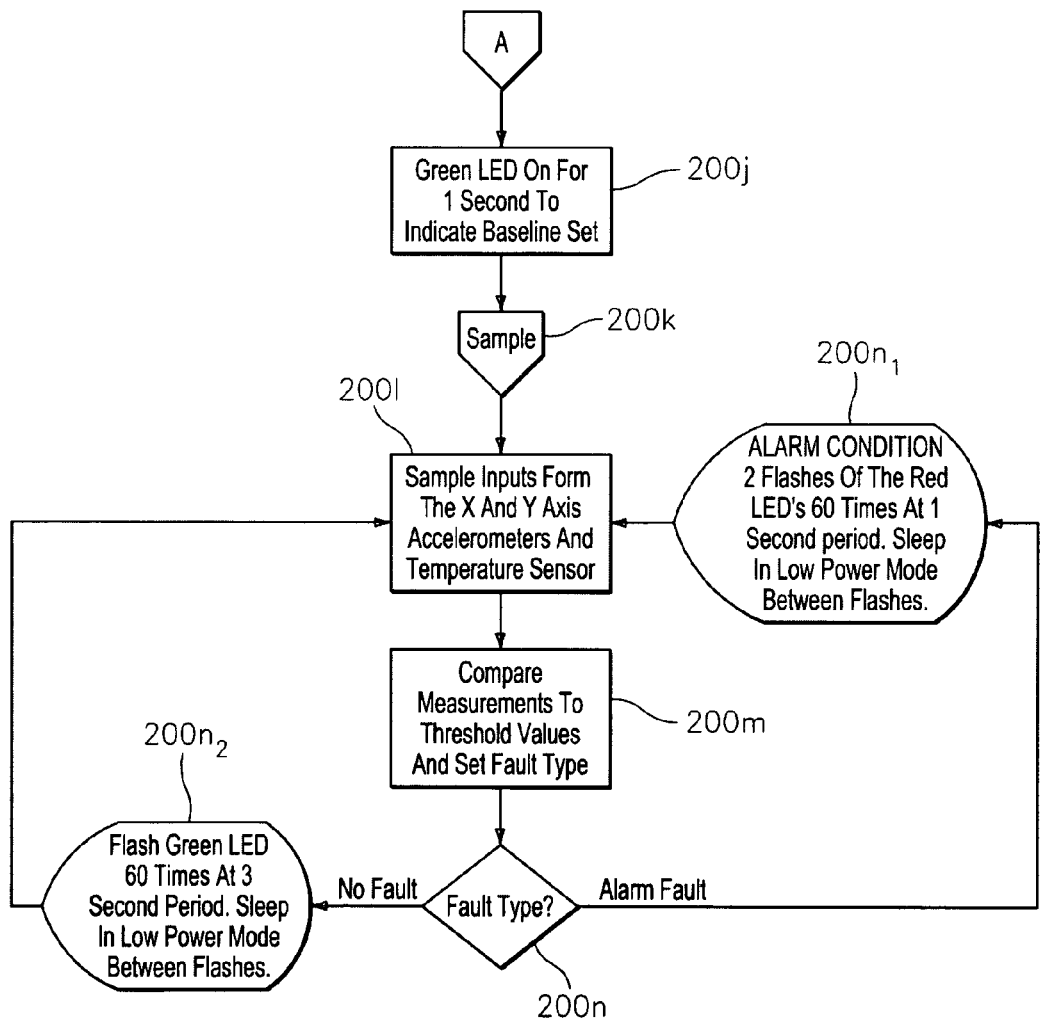

FIGS. 3a, 3b

One Embodiment

FIGS. 3a and 3b show a logic flowchart generally indicated as 200 having steps 200a, 200b, . . . , $200n_1$, $200n_2$ of a method according to some embodiments of the present invention.

The small, self-contained condition monitoring device 10, 100 is typically secured to a pump bearing frame (thrust bearing end) of a pump, as well as another suitable location on a pump, and provides near continuous monitoring of bearing housing vibration and temperature. The disposable, compact, self-contained, battery operated, warning and alarming condition monitoring device may be mounted on the bearing frame such as a recess in a manner so as to protect the integrity of temperature readings from windage or physical damage and in an area which monitors temperature and 2 or more-axis vibration at the thrust bearing.

In general, in the monitoring device sampling may be done every couple minutes, e.g. three minutes, although the scope of the invention is not intended to be limited to any particular sampling time interval. The monitoring device will flash an LED, e.g. a green LED, to indicate that the pump vibration/temperature are within the normal operating range. If either the vibration or temperature exceeds the alarm thresholds an LED, e.g. a red LED, will flash to indicate an alarm condition exists. An unskilled operator can then visually survey pump installations more frequently to determine which pumps are in distress so that preventive maintenance can be performed.

The overall operation of some embodiments of the present invention is described below, by way of example, as follows:

Steps 200a, 200b are shown by way of example as basic routines for initialization for implementing the present invention.

Step 200c is a routine for entering the processor into the low power mode when either the Hall sensor is not activated or the Hall sensor is active for more than some number of LED flash sequences, e.g. 3 flashes.

Step 200d is a routine for determining if the hall sensor is activated. If the Hall sensor is activated and the processor is in the low power mode, then steps 200e, 200f, 200g, 200j, 200k are performed. If the Hall sensor is activated and the processor is running, then step 200h is perform, which is a routine for determining if the Hall sensor is active for more than some number of LED flash sequences, as discussed above. If the Hall sensor is active for less than some number of LED flash sequences and the processor is running, then sampling step 200i is performed.

Steps 200e, 200f, 200g, 200j are performed as part of the start-up routine to determine the start-up vibration level (also known herein as "the baseline" level) and provide an appropriate indication that it is set in step j.

Steps 200k, 200l are performed as part of the sensing of the subsequent vibration level for providing the subsequent vibration level signal containing information about the subsequent vibration level.

Steps 200m, 200n, $200n_1$, $200n_2$ are performed as part of the monitoring routine for making the comparison of the start-up vibration level and subsequent vibration level, and monitoring the second device based on the comparison.

It is important to note that the numerical values set forth in the steps in FIGS. 3a, 3b are provided only by way of example, and are not intended in any way to be limiting. For example, the step 200f provides for taking 8 samples period to establish an average baseline and setting the alarm level at a multiple of 200%. However, consistent with that discussed above, embodiments are envisioned using other numbers of samples like 4, 5, 6, 7, 9, 10, etc. or using other multiples like 150%, 250%, etc.

When operated in accordance with the aforementioned logic algorithm, the present invention provides a low cost, disposable, compact, self contained, battery operated warning and/or alarming device which provides an indication on the condition of operation based on the evaluation of the one or more physical parameters being sensed.

The monitoring device can sense both temperature and vibration rather than just temperature as in other known devices. Temperature is a relatively straight forward parameter to measure. Vibration measurement is more difficult to measure as it requires conditioning of the signal as to frequency range and conversion from g's acceleration to a velocity measurement in inches per second by the op-amp integrator.

The monitoring device is unique in the fact that the baseline measurement of vibration is tailored to the individual machine installation and application. These threshold values are not pre-determined in advance as in the other known devices but are determined for the particular installation and application. Each installation is unique.

The monitoring device also does not provide a control "cutoff switch" function as in the other known devices.

The monitoring device is mainly intended to monitor a pump although it can also monitor a fan, compressor or turbine or other rotating piece of equipment. The other known devices are specifically designed to monitor a motor.

The monitoring device does not have a data logging function as does other known devices.

Other known devices can be used in a variety of applications; i.e., any application which uses an electric motor; however, they do not monitor the driven equipment as does the monitoring device of the present invention. Monitoring of the driver alone does not predict the health of the driven equipment.

Figure 4:
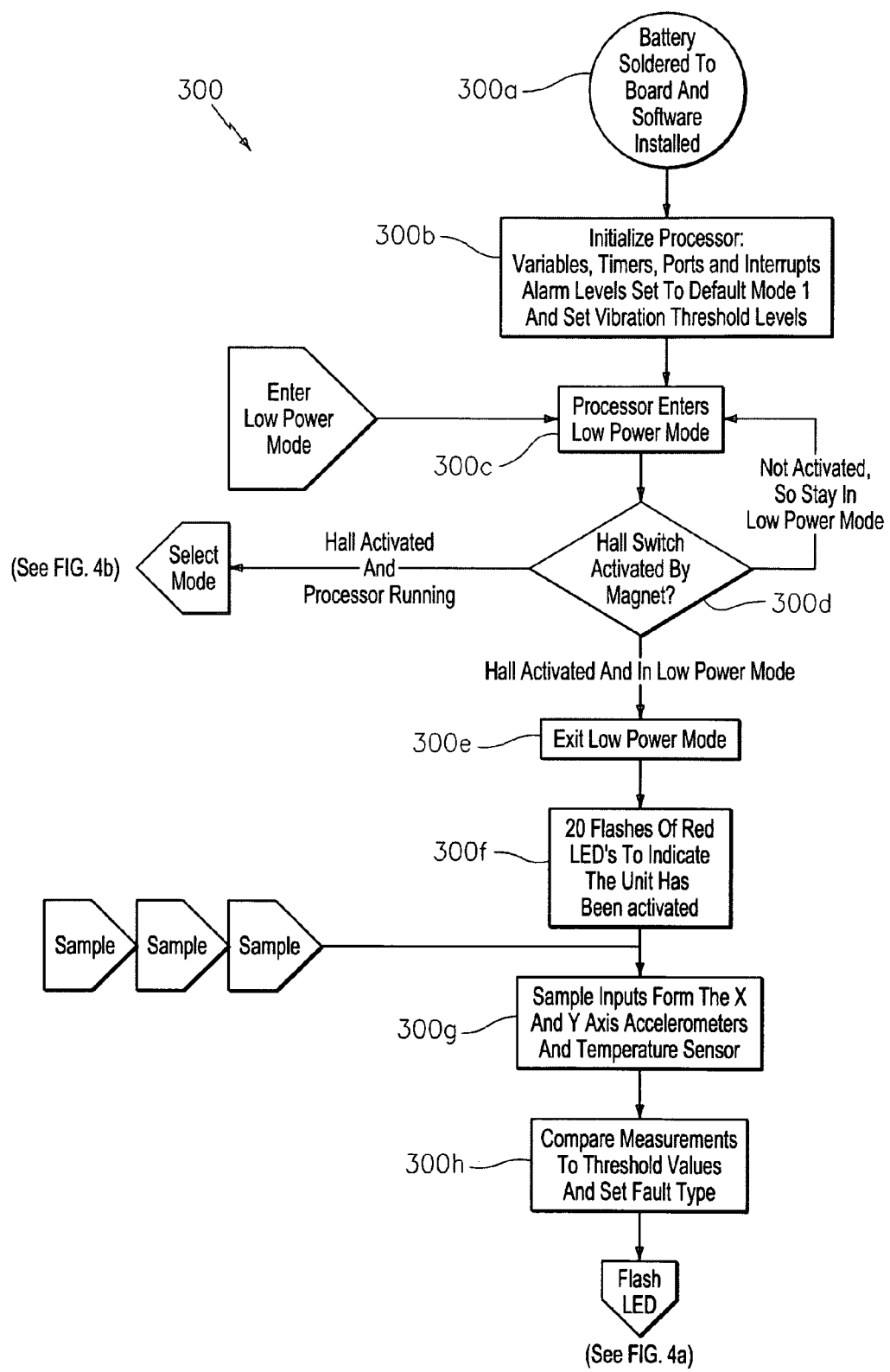
FIG. 4 is a logic flowchart having steps of a method according to some embodiments of the present invention.
Figure 4A:
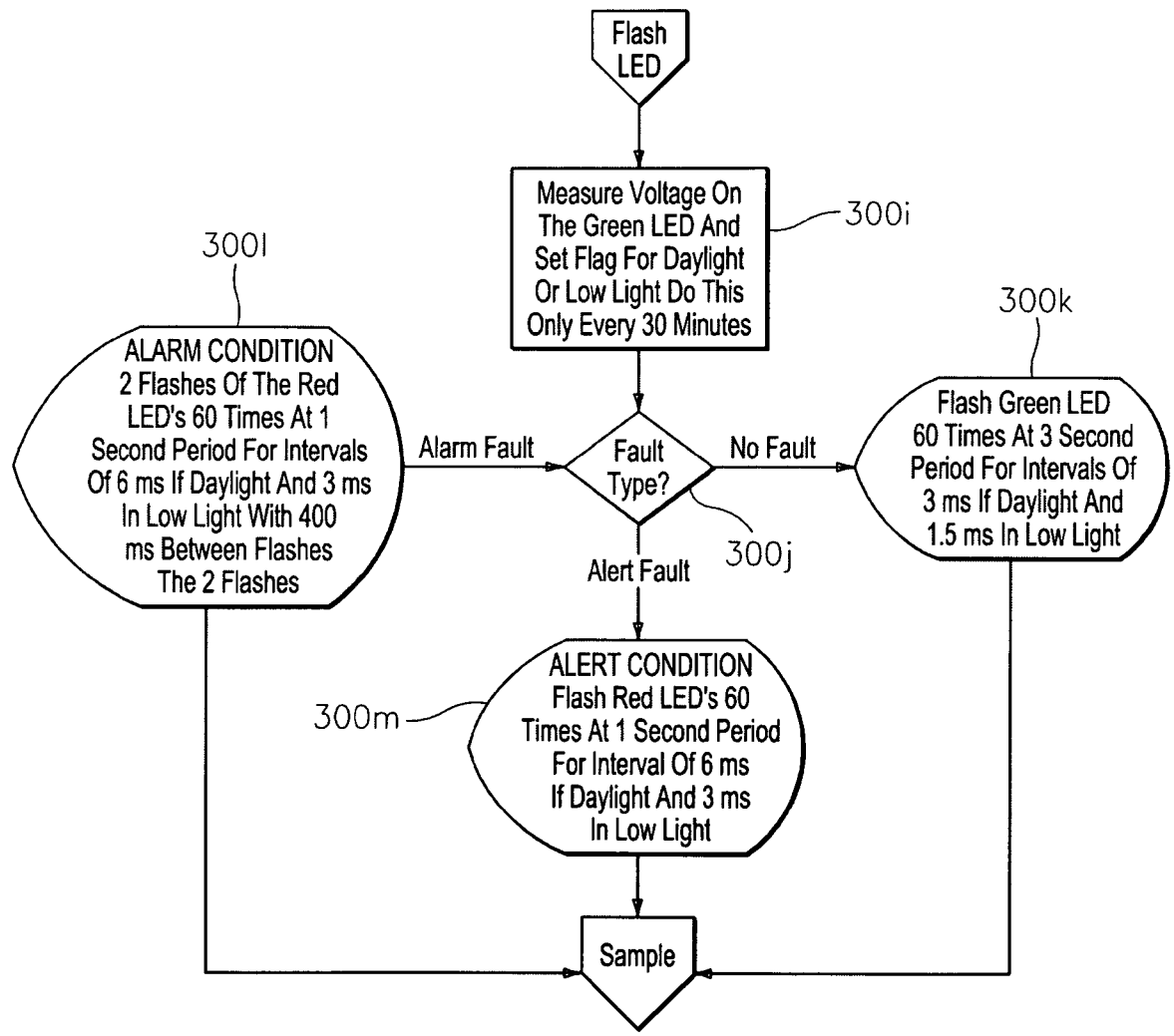
FIG. 4a is a flowchart having steps related to the flash of an LED in the method shown in FIG. 4.
Figure 4B:
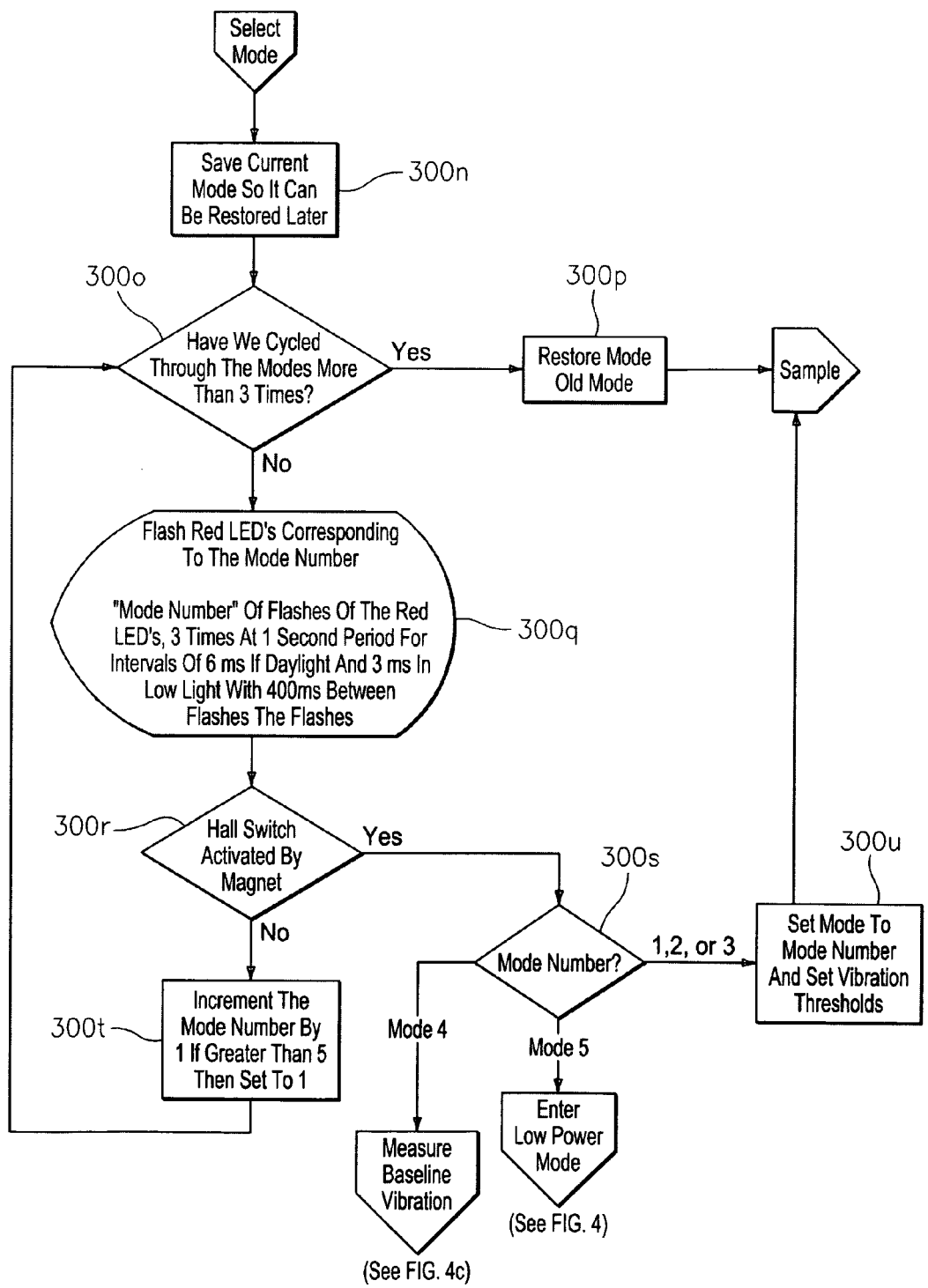
FIG. 4b is a flowchart having steps related to the selection of the mode in the method shown in FIG. 4.
Figure 4C:
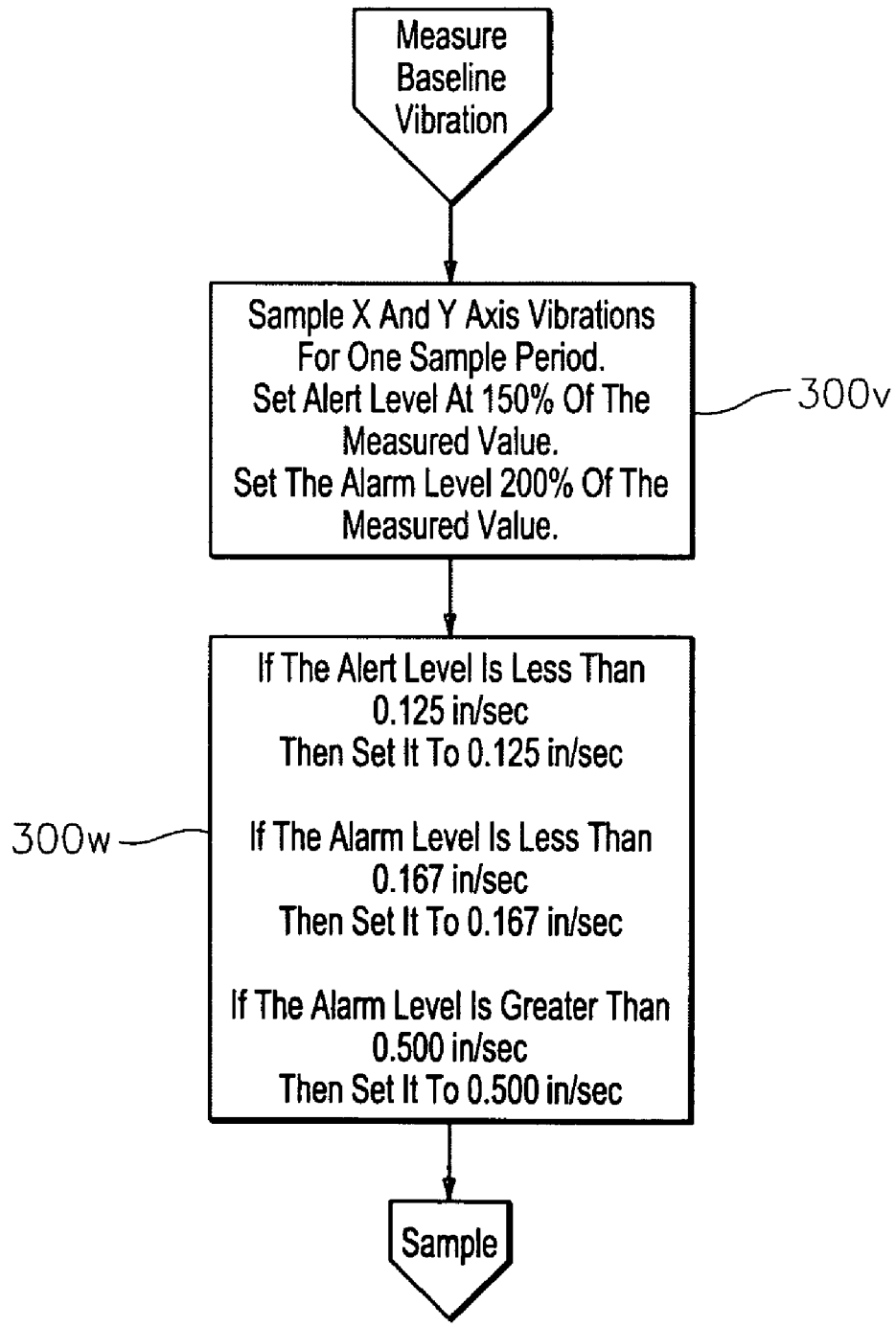
FIG. 4c is a flowchart having steps related to the measure of baseline vibration in the flowchart shown in FIG. 4b.

FIGS. 4-4c

Alternative Embodiment

FIGS. 4-4c show an alternative embodiment of the logic algorithm generally indicated as 300 having steps 300a, 300b, 300c, . . . 300w for implementing in the present technique as a disposable, compact, self-contained, battery operated, mems, analog/digital 2 axis vibration and temperature monitoring and warning/alarming device. When the logic algorithm in FIG. 3a, 3b is compared to that in FIGS. 4-4c, it is evident that steps have been added to the LED flash routine in FIG. 4a, and the select mode routine in FIG. 4b has been added in its entirety. Other steps have also been modified slightly.

The overall operation of some embodiments of the present invention is described below, by way of example, as follows:

The monitoring device 10, 100 may be initially activated by passing a small magnet over the Hall Sensor. The monitoring device then enters the sampling mode for vibration and temperature. If the Hall Sensor is activated again while in the sampling mode, the monitoring device enters the Mode Selection process. The LED flashing pattern indicates status by various color and flashing schemes. For example, when alive and in monitoring mode (no alert or alarm exists), a green LED flashes once every 3 seconds. If a vibration condition exceeds a selectable 150% baseline setting, a default vibration alert setting, a LO HP vibration alert setting or a HI HP vibration alert setting, an alert will be initiated which consists of an LED single red flash each second. If a vibration condition exceeds a selectable 200% baseline setting, a default vibration alarm setting, a LO HP vibration alarm setting or a HI HP vibration alarm setting, an alarm will be initiated which consists of a LED double red flash each second. The flashing scheme for an alert or alarm will be initiated, e.g., if the sampled vibration exceeds the selected mode threshold for at least two consecutive samples, although the scope of the embodiment is not intended to be limited to the number of consecutive samples. If an Alert or Alarm condition is triggered, the next sample is taken after 60 seconds. Once in an Alert or Alarm mode, if a subsequent vibration or temperature reading falls below the trigger point the condition shall return to normal (green LED flashes once every three seconds). If both an Alert and an Alarm condition exist the blinking scheme shall be for the most severe "Alarm" condition. In this embodiment, there is no distinction made in the LED flashing sequence between a vibration and temperature condition, although embodiments are envisioned in which a distinction can be made in the LED flashing sequence between the vibration and temperature condition.

The flashing scheme for temperature may also be similar if the sampled temperature exceeds the threshold value for two consecutive samples. The thresholds for temperature alert/alarm conditions are fixed as follows:

An Alert shall be initiated if two successive samplings exceed, e.g. about 175° F. An Alarm shall be initiated if two successive samples exceed, e.g. about 185° F. Temperature and vibration are sampled every three minutes unless an alert/alarm exists in which case the next sample is taken after 60 seconds. Sampling time is 5-10 seconds.

The mode setting may be accomplished by passing a magnet over the Hall Sensor while in normal mode (green LED flashes every three seconds). Alternately, other types of sensors either now known or later developed in the future may be used in place of the Hall sensor to accomplish the desired triggering and setting of the device. During the Mode selection process sampling is turned off.

In one embodiment, there are five Modes shown in 4b which can be selected as follows:

Mode 1—Default vibration settings: Alert >0.15 in/s, Alarm >0.30 in/s

Mode 2—Low HP application settings: Alert >0.125 in/s, Alarm >0.250 in/s

Mode 3—High HP application settings: Alert >0.175 in/s, Alarm >0.350 in/s

Mode 4—Baseline Alert setting: Alert >Measured baseline value*1.5, Alarm: >Measured baseline value*2. Never alert if <0.125 in/sec, never alarm if <0.167 in/sec, always alarm if >0.5 in/sec.

Mode 5—Sleep: The processor is put to sleep (used when the pump is taken out of service to conserve battery power). In the sleep mode no settings or baseline values are saved.

Note the baseline setting for vibration is set after Mode 4 is selected in the device. Subsequent to the selection of Mode 4 the next vibration reading is set as the baseline.

The particular Mode setting is selected by observing flashes of the red LED as follows:

One flash for Mode 1
Two flashes for Mode 2
Three flashes for Mode 3
Four flashes for Mode 4
Five flashes for Mode 5.

Other flash combinations and colors can also be used to accomplish the above. This would be obvious to one skilled in the art. Once the mode is selected by passing a magnet over the Hall Sensor, the green LED flashes to confirm the selection. If no selection is made after the device passes through three complete mode setting cycles, the selection will default to the mode which was previously in effect prior to activating the Mode set menu. Once the Mode set menu is exited the sampling mode is turned back on.

A battery save feature samples the battery voltage and green LED voltage every 30 minutes where if the LED voltage is less than 1 volt then the device is considered to have been installed in the dark (night) or if the LED voltage is greater than 1 volt then the device is considered to have been installed in the sun (day). If determined to have been installed in the dark (night), the LED "ON" duration time shall be cut by 50%. The green LED generated voltage in bright sunlight is approximately 1.5 volts. The battery voltage is 3 volts.

By way of example, an accelerometer may be housed on a separate board where this separate board has a projection (tenon) which is fitted into a slot (mortise) on a main board for mounting and soldering to the accelerometer/board. The mounting orientation of the accelerometer board is such that it is in a correct and stable plane (perpendicular to the main processor board) to measure both vertical and horizontal vibration at the thrust bearing (2 axis vibration). The two boards and accelerometer are soldered to achieve both electrical connection to the accelerometer and structural support between the two boards.

By way of example, the temperature measurement may be accomplished through an integrated circuit temperature measuring device where the output voltage is inversely proportional to temperature. The main board can have a circular hole which is lined with a heat conductive trace and is electrically connected to the temperature measuring device.

The circular hole with heat conductive trace in the main board accepts a stainless steel (or other conductive material) shouldered standoff which is in direct contact with the bearing frame and heat conductive trace. Heat is conducted from the bearing frame to the standoff and along the heat conductive trace to the integrated circuit temperature measuring device. Temperature compensation is achieved by software.

Consistent with that shown and described herein, the technique according to the present invention may include one or more of the following features: sampling the one or more physical parameters at predetermined intervals of time; providing a visual indication that the one or more physical parameters are within a normal range; flashing an light emitting diode (LED) with some predetermined color, such as red or green; providing an audio indication, or a visual indication, or some combination thereof, that the one or more physical parameters exceeds a predetermined threshold to indicate an alert or alarm condition exists; responding to a vibration and/or temperature alert or alarm condition by flashing LED colors, such as red, and a sequence pattern for the LED's to distinguish between alert or alarm conditions to the user; activating the disposable, compact, self-contained, battery operated, warning and alarming condition monitoring device by passing a magnet over a sensor; using multiple physical parameters for monitoring the vibration of the device; flashing a different visual indication for a respective predetermined number of time per second when the sensed vibration of the device exceed each of the multiple physical parameters; using multiple physical parameters for monitoring the temperature of the device; initiating an alert if a predetermined number of successive samplings exceeds a first predetermined threshold temperature value; initiating an alarm if a predetermined number of successive samplings exceeds a second predetermined threshold temperature value that is higher than the first predetermined threshold temperature value; sampling the one or more physical parameters at different frequencies depending on the state of the monitoring of the device; using multiple modes, including default vibration settings, low horsepower (HP) settings, high horsepower (HP) settings, baseline settings, a sleep setting, or some combination thereof; setting the modes by passing a magnet over a sensor; providing a respective visual indication for each of the multiple modes; using an accelerometer in the disposable, compact, self-contained, battery operated, warning and alarming condition monitoring device for sensing the vibration of the device; using an integrated circuit temperature measuring device in the disposable, compact, self-contained, battery operated, warning and alarming condition monitoring device for sensing the temperature of the device; making an evaluation by one or more modules contained within the disposable, compact, self-contained, battery operated, warning and alarming condition monitoring device; providing one or more sensed physical parameters to another device for evaluations; receiving one or more signals back from the other device containing information for providing the indication of the condition of operation of the device.

This present invention may also take the form of a system which consists of a disposable, compact, self-contained, battery operated, mems, analog/digital one and two axis vibration and temperature monitoring and warning/alarming device which is installed on a flat section of a pump bearing frame in a manner which is protected mechanically and from windage to maintain the integrity of the temperature readings and oriented to provide thrust bearing temperature and one and two axis vibration. Alternately, the device can be secured to a fan, compressor, turbine or other rotating or reciprocating piece of machinery. Moreover, although the present invention is described in relation to measuring vibration along two axes, the scope of the invention is not intended to be limited to the same, because embodiments are envisioned where three axis vibration can also be measured.

POSSIBLE APPLICATIONS

Other possible applications include at least the following:
One or two axis vibration and temperature monitoring in pumps, fans, compressors, turbines and any other rotating or reciprocating equipment where local vibration and/or temperature warning and alarming is desired.

THE SCOPE OF THE INVENTION

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

We claim:

1. A condition monitoring apparatus for securing onto and monitoring a device comprising:
    a signal processor configured to sample an X-axis start up vibration level input signal and a Y-axis start up vibration level input signal at the start up of the device being monitored;
    sample an X-axis subsequent vibration level input signal and a Y-axis subsequent vibration level input signal at a subsequent time after the startup of the device being monitored;
    sample a temperature sensor input signal at the subsequent time after the startup of the device being monitored; and
    monitor the device based at least partly on the following:
        (i) making an X-axis comparison between the X-axis start up vibration level input signal and the X-axis subsequent vibration level input signal;
        (ii) making a Y-axis comparison between the Y-axis start up vibration level input signal and the Y-axis subsequent vibration level input signal;
        (iii) making a temperature comparison between the temperature sensor input signal and a temperature threshold value signal;
        (iv) annunciating a high vibration or temperature indication for a high vibration or temperature condition associated with the device if either the X-axis comparison, the Y-axis comparison or the temperature comparison exceeds a respective threshold value associated with the device for at least two successive samples, or annunciating a normal indication.

2. A condition monitoring apparatus according to claim 1, wherein if the high vibration or temperature indication is annunciated, then the signal processor is configured to
    re-sample the X-axis subsequent vibration level input signal and the Y-axis subsequent vibration level input signal at a next subsequent time that is a predetermined time less than a normal predetermined sampling time;
    re-sample the temperature sensor input signal at the next subsequent time;
    make the X-axis comparison, the Y-axis comparison and the temperature comparison; and
    annunciate the normal indication if the X-axis comparison, the Y-axis comparison and the temperature comparison fall below the respective threshold value associated with the device so as to reset the condition monitoring apparatus.

3. A condition monitoring apparatus according to claim 1, wherein the signal processor is configured to
    annunciate a different high vibration or temperature indication if a next successive sampling of either the X-axis comparison, the Y-axis comparison or the temperature comparison exceeds a second threshold value.

4. A condition monitoring apparatus according to claim 1, wherein the device is a pump having a bearing frame and a thrust bearing, and the condition monitoring apparatus is mounted on a recess of the bearing frame of the pump so as to protect the integrity of temperature readings from windage and the condition monitoring apparatus from physical damage and mounted in an area on the bearing frame which monitors temperature and X and Y axes vibration of the thrust bearing of the pump.

5. A condition monitoring apparatus according to claim 1, wherein the signal processor is configured to monitor the device but not to cut-off or control the device.

6. A condition monitoring apparatus according to claim 1, wherein the signal processor is configured to
- repeat the sampling of the X-axis subsequent vibration level input signal, the Y-axis subsequent vibration level input signal and the temperature sensor input signal at a next subsequent time after the startup of the device being monitored; and
- monitor the device based at least partly on the following:
  - (i) making the X-axis comparison, the Y-axis comparison and the temperature comparison based on the X-axis subsequent vibration level input signal, the Y-axis subsequent vibration level input signal and the temperature sensor input signal sampled at the next subsequent time; and
  - (ii) annunciating the high vibration or temperature indication for the high vibration or temperature condition associated with the device if either the X-axis comparison, the Y-axis comparison or the temperature comparison exceeds the respective threshold value associated with the device for at least two successive samples, or annunciating the normal indication.

7. A condition monitoring apparatus according to claim 1, wherein the annunciating includes an audio indication, or a visual indication, or some combination thereof.

8. A condition monitoring apparatus according to claim 1, wherein the signal processor is configured to periodically enter the condition monitoring apparatus into a low power mode in order to save power.

9. A condition monitoring apparatus according to claim 1, wherein the signal processor is configured to determine a start-up vibration level threshold value based on a multiple of a sampled start-up vibration level measured along either the X or Y axis of the device.

10. A condition monitoring apparatus according to claim 1, wherein the signal processor is configured to determine a range of start-up vibration level threshold values, including a lowest possible predetermined start-up vibration level value and a highest possible predetermined start-up vibration level value.

11. A method for monitoring a device comprising:
- sampling with a signal processor an X-axis start up vibration level input signal and a Y-axis start up vibration level input signal at the start up of the device being monitored;
- sampling with the signal processor an X-axis subsequent vibration level input signal and a Y-axis subsequent vibration level input signal at a subsequent time after the startup of the device being monitored;
- sample with the signal processor a temperature sensor input signal at the subsequent time after the startup of the device being monitored; and
- monitoring the device based at least partly on the following:
  - (i) making an X-axis comparison between the X-axis start up vibration level input signal and the X-axis subsequent vibration level input signal;
  - (ii) making a Y-axis comparison between the Y-axis start up vibration level input signal and the Y-axis subsequent vibration level input signal;
  - (iii) making a temperature comparison between the temperature sensor input signal and a temperature threshold value signal;
  - (iv) annunciating a high vibration or temperature indication for a high vibration or temperature condition associated with the device if either the X-axis comparison, the Y-axis comparison or the temperature comparison exceeds a respective threshold value associated with the device for at least two successive samples, or annunciating a normal indication.

12. A method according to claim 11, wherein the method further comprises, if the high vibration or temperature indication is annunciated, then
- re-sampling with the signal processor the X-axis subsequent vibration level input signal and the Y-axis subsequent vibration level input signal at a next subsequent time that is less than a normal predetermined sampling time;
- re-sampling with the signal processor the temperature sensor input signal at the next subsequent time;
- making the X-axis comparison, the Y-axis comparison and the temperature comparison; and
- annunciating the normal indication if the X-axis comparison, the Y-axis comparison and the temperature comparison fall below the respective threshold value associated with the device so as to reset the condition monitoring apparatus.

13. A method according to claim 11 wherein the method annunciates a different high vibration or temperature indication if a next successive sampling of either the X-axis comparison, the Y-axis comparison or the temperature comparison exceeds a second threshold value.

14. A method according to claim 11, wherein the device is a pump having a bearing frame and a thrust bearing, and the method comprises mounting the condition monitoring apparatus on a recess of the bearing frame of the pump so as to protect the integrity of temperature readings from windage and the condition monitoring apparatus from physical damage and mounted in an area on the bearing frame which monitors temperature and X and Y axes vibration of the thrust bearing of the pump.

15. A method according to claim 11, wherein the method comprises monitoring with the signal processor the device but not cutting-off or controlling the device.

16. A method according to claim 11, wherein the method comprises:
- repeating with the signal processor the sampling of the X-axis subsequent vibration level input signal, the Y-axis subsequent vibration level input signal and the temperature sensor input signal at a next subsequent time after the startup of the device being monitored; and
- monitoring the device based at least partly on the following:
  - (i) making the X-axis comparison, the Y-axis comparison and the temperature comparison based on the X-axis subsequent vibration level input signal, the Y-axis subsequent vibration level input signal and the temperature sensor input signal sampled at the next subsequent time; and
  - (ii) annunciating the high vibration or temperature indication for the high vibration or temperature condition associated with the device if either the X-axis comparison, the Y-axis comparison or the temperature comparison exceeds the respective threshold value associated with the device for at least two successive samples, or annunciating the normal indication.

17. A method according to claim 11, wherein the annunciating includes an audio indication, or a visual indication, or some combination thereof.

18. A method according to claim 11, wherein the method comprises periodically entering with the signal processor the condition monitoring apparatus into a low power mode in order to save power.

19. A method according to claim 11, wherein the method comprises determining with the signal processor a start-up vibration level threshold value based on a multiple of a sampled start-up vibration level measured along either the X or Y axis of the device.

20. A method according to claim 11, wherein the method comprises determining with the signal processor a range of start-up vibration level threshold values, including a lowest possible predetermined start-up vibration level value and a highest possible predetermined start-up vibration level value.

* * * * *